(12) United States Patent  
Sun

(10) Patent No.: US 12,127,129 B2  
(45) Date of Patent: Oct. 22, 2024

(54) SRS POWER CONTROL METHOD AND DEVICE

(71) Applicant: VIVO MOBILE COMMUNICATION CO., LTD., Guangdong (CN)

(72) Inventor: Xiaodong Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 404 days.

(21) Appl. No.: 17/515,283

(22) Filed: Oct. 29, 2021

(65) Prior Publication Data

US 2022/0053427 A1   Feb. 17, 2022

Related U.S. Application Data

(63) Continuation of application No. PCT/CN2020/086976, filed on Apr. 26, 2020.

(30) Foreign Application Priority Data

Apr. 30, 2019   (CN) .......................... 201910363053.2

(51) Int. Cl.  
*H04W 52/00* (2009.01)  
*H04W 52/08* (2009.01)  
*H04W 52/24* (2009.01)  
*H04W 52/32* (2009.01)  
*H04W 52/36* (2009.01)

(52) U.S. Cl.  
CPC .......... *H04W 52/08* (2013.01); *H04W 52/242* (2013.01); *H04W 52/325* (2013.01); *H04W 52/367* (2013.01)

(58) Field of Classification Search  
CPC .......... H04W 40/02; H04W 6/11; H04L 45/66  
See application file for complete search history.

(56) References Cited

U.S. PATENT DOCUMENTS

| | | | |
|---|---|---|---|
| 2015/0296490 A1 | 10/2015 | Yi et al. | |
| 2016/0219534 A1 | 7/2016 | Hao et al. | |
| 2018/0213552 A1 | 7/2018 | Wei et al. | |
| 2019/0075524 A1* | 3/2019 | Zhou | .................. H04W 72/046 |
| 2020/0236629 A1 | 7/2020 | Zhang | |

FOREIGN PATENT DOCUMENTS

| | | | | |
|---|---|---|---|---|
| CA | 3064824 A1 * | 1/2019 | ............... | H04B 7/00 |
| CN | 103379603 A | 10/2013 | | |
| CN | 104518845 A | 4/2015 | | |
| CN | 104854924 A | 8/2015 | | |
| CN | 108029118 A | 5/2018 | | |

(Continued)

OTHER PUBLICATIONS

International Search Report of International Application No. PCT/CN2020/086976 mailed on Jun. 29, 2020.

(Continued)

*Primary Examiner* — Erika A Washington  
(74) *Attorney, Agent, or Firm* — IP & T GROUP LLP

(57) ABSTRACT

An SRS power control method includes: receiving a power control parameter, the power control parameter being used to determine a transmitting power of an additional SRS; and determining the transmission power and a power headroom of the additional SRS according to the power control parameter.

20 Claims, 4 Drawing Sheets

100

(56) References Cited

FOREIGN PATENT DOCUMENTS

| CN | 109151979 A | 1/2019 |
|---|---|---|
| CN | 109640385 A | 4/2019 |
| WO | 2018118532 A1 | 6/2018 |
| WO | 2018176491 A1 | 10/2018 |

OTHER PUBLICATIONS

Written Opinion of The International Searching Authority of International Application No. PCT/CN2020/086976 mailed on Jun. 29, 2020.
First Office Action of Priority Application No. 201910363053.2 mailed on Nov. 4, 2020.
Second Office Action of Priority Application No. 201910363053.2 mailed on May 27, 2021.
Ericsson, ST-Ericsson, Details about SRS power control, R1-123743, 3GPP TSG RAN WG1 Meeting #70, Aug. 2012.
Huawei, HiSilicon, Introduction of additional SRS Symbols in normal UL subframe, R1-1904010, 3GPP TSG RAN WG1 Meeting #96bis, Apr. 2019.
VIVO, Remaining issues on additional SRS symbols, R1-1904056, 3GPP TSG RAN WG1 Meeting #96bis, Apr. 2019.

* cited by examiner

400

Transmitting a power control parameter, wherein the power control parameter is used for a terminal device to determine a transmitting power of an additional SRS — S402

SRS POWER CONTROL METHOD AND DEVICE

CROSS-REFERENCE TO RELATED APPLICATIONS

This application is a Bypass Continuation Application of PCT/CN2020/086976 filed on Apr. 26, 2020, which claims priority to Chinese Patent Application No. 201910363053.2 filed on Apr. 30, 2019, which are incorporated herein by reference in their entirety.

TECHNICAL FIELD

Embodiments of the present disclosure relate to the technical field of communication, and in particular to a sounding reference signal (SRS) power control method and a device.

BACKGROUND

The uplink power control in the wireless system is very important. Through reasonable uplink power control, the uplink data quality can be ensured, and the interference to other users in the system can be reduced as much as possible, so that the battery life of the terminal device is prolonged. In order to increase the coverage and capacity of the SRS, an additional SRS is introduced into LTERel-16. The additional SRS and a legacy SRS may be transmitted in one transmission time interval (TTI). However, there is no solution related to additional SRS power control currently. Therefore, it is necessary to provide a technical solution related to the additional SRS power control so as to realize power control on the additional SRS.

SUMMARY

According to a first aspect, an SRS power control method is provided. The method is performed by a terminal device. The method includes: receiving a power control parameter, wherein the power control parameter is used to determine a transmitting power of an additional SRS; and determining the transmitting power of the additional SRS according to the power control parameter.

According to a second aspect, an SRS power control method is provided. The method is performed by a network device. The method includes: transmitting a power control parameter, wherein the power control parameter is used for a terminal device to determine a transmitting power of an additional SRS.

According to a third aspect, a terminal device is provided. The terminal device includes: a receiving module, configured to receive a power control parameter, wherein the power control parameter is used to determine a transmitting power of an additional SRS; and a power control module, configured to determine the transmitting power of the additional SRS according to the power control parameter.

According to a fourth aspect, a network device is provided. The network device includes: a transmitting module, configured to transmit a power control parameter, wherein the power control parameter is used for a terminal device to determine a transmitting power of an additional SRS.

According to a fifth aspect, a terminal device is provided. The terminal device includes a processor, a memory, and a computer program stored in the memory and executable on the processor. When the computer program is executed by the processor, the steps of the SRS power control method provided in the first aspect are implemented.

According to a sixth aspect, a network device is provided. The network device includes a processor, a memory, and a computer program stored in the memory and executable on the processor. When the computer program is executed by the processor, the steps of the SRS power control method provided in the second aspect are implemented.

According to a seventh aspect, a non-transitory computer readable storage medium is provided. The non-transitory computer readable storage medium stores a computer program; and when the computer program is executed by a processor, the steps of the SRS power control methods provided in the first aspect and the second aspect are implemented.

BRIEF DESCRIPTION OF THE DRAWINGS

The accompanying drawings illustrated herein are provided to understand the present application and form a part of the present application. The exemplary embodiments of the present application and the descriptions thereof are used to explain the present application and do not constitute an improper limitation on the present application. In the accompanying drawings.

DETAILED DESCRIPTION OF EMBODIMENTS

To make the objectives, technical solutions, and advantages of the present application clearer, the following clearly describes the technical solutions of the present application with reference to the embodiments of the present application and the corresponding accompanying drawings. Apparently, the described embodiments are merely some rather than all of the embodiments of the present application. All other embodiments obtained by a person of ordinary skill in the art based on the embodiments of the present application shall fall within the protection scope of the present application. In the specification, "and/or" is used to indicate at least one of connected objects.

It should be understood that the technical solutions in the embodiments of the present disclosure may be applied to various communication systems, such as a long term evolution (LTE) system, a LTE frequency division duplex (FDD) system, LTE time division duplex (TDD), a universal mobile telecommunications system (UMTS) or a worldwide interoperability for microwave access (WiMAX) communication system, a 5G system, or a new radio (NR) system, or a subsequent evolution communication system.

In the embodiments of the present disclosure, a terminal device may include, but is not limited to a mobile station (MS), a mobile terminal, a mobile telephone, user equipment (UE), a handset, portable equipment, a vehicle, and the like. The terminal device may communicate with one or more core networks by using a radio access network (RAN). For example, the terminal device may be a mobile telephone (or referred to as a "cellular" telephone), or a computer having a wireless communication function; or the terminal device may be a portable, pocket-sized, handheld, computer built-in, or vehicle-mounted mobile device.

In the embodiments of the present disclosure, a network device is an apparatus that is deployed in a radio access network and that is used to provide a wireless communication function for a terminal device. The network device may be a base station, and the base station may include various forms such as a macro base station, a micro base station, a relay station, or an access point. In systems that use different radio access technologies, devices that have a base station function may have different names. For example, an evolved NodeB (eNB or eNodeB) in an LTE network is called a Node B in a 3rd generation (3G) network, or a network device in a subsequent evolution communications system, but the use of the words does not constitute a restriction.

Figure 1:
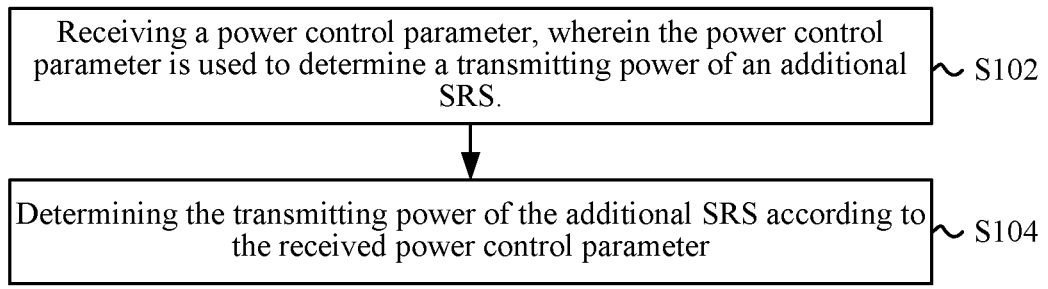
FIG. 1 is a flowchart of an SRS power control method according to an embodiment of the present disclosure.

As shown in FIG. 1, an embodiment of the present disclosure provides an SRS power control method 100. The method may be performed by a terminal device, and includes the following steps:

S102: receiving a power control parameter, wherein the power control parameter is used to determine a transmitting power of an additional SRS.

The power control parameter is required when the transmitting power of the additional SRS is determined; therefore, in this step, the terminal device may firstly receive the power control parameter from a network device.

The power control parameter may include at least one of:
a target receiving power (Po) of the additional SRS;
a pathloss calculation compensation factor (alpha) of the additional SRS;
a pathloss calculation reference signal (RS) of the additional SRS;
a closed loop power control process identification of the additional SRS; or
a closed loop power control adjustment quantity of the additional SRS.

Optionally, the power control parameter may be configured or indicated by at least one of:
a radio resource control (RRC) signaling;
a medium access control control element (MAC CE) signaling; or downlink control information (DCI).

S104: determining the transmitting power of the additional SRS according to the received power control parameter.

After receiving the power control parameter, the terminal device may determine the transmitting power of the additional SRS according to the power control parameter.

In the embodiments of the present disclosure, the terminal device receives the power control parameter for determining the transmitting power of the additional SRS and determines the transmitting power of the additional SRS according to the power control parameter so as to realize power control on the additional SRS.

The embodiments of the present disclosure may avoid the problem of low signal quality of the additional SRS caused by inaccurate additional SRS power control or the problem of interference to other users in a communication system by the additional SRS as far as possible, thereby improving communication effectiveness and reliability.

For the power control parameter mentioned in the above embodiments, optionally, in one embodiment, the power control parameter includes a first power control parameter and a second power control parameter, wherein the first power control parameter is configured by the RRC signaling; and the second power control parameter is indicated by the DCI.

For example, the network device may configure at least one of the parameters of the additional SRS for the terminal device through the RRC signaling: a target receiving power; a pathloss calculation compensation factor; a pathloss calculation reference signal; and a closed loop power control process identification. The network device may also indicate a closed loop power control adjustment quantity of the additional SRS for the terminal device through the DCI.

For the additional SRS mentioned in the above embodiments, the additional SRS and a legacy SRS may be transmitted in one TTI. In order to accurately realize power control on the additional SRS and the legacy SRS, optionally, the network device may indicate and/or configure power control parameters for the additional SRS and the legacy SRS respectively, that is, the power control parameter of the additional SRS and the power control parameter of the legacy SRS are independently configured and/or independently indicted, wherein the power control parameter of the legacy SRS may have the same type (or parameter name) as that of the power control parameter of the additional SRS, but the parameter values may be the same, or may also be different.

The power control parameter of the above-mentioned additional SRS includes a first power control parameter and a second power control parameter, wherein the second power control parameter is indicated by DCI. Optionally, the second power control parameter includes a transmission power control (TPC) command. The application of the TPC command will be described in the following three implementation manners:

(1) the TPC command is used to indicate a closed loop power control adjustment quantity of the additional SRS; or (2) the TPC command is used to indicate a closed loop power control adjustment quantity of the legacy SRS; or (3) the TPC command is used to indicate a closed loop power control adjustment quantity of the additional SRS and a closed loop power control adjustment quantity of the legacy SRS at the same time.

For the implementation manner I and the implementation manner II, optionally, the second power control parameter may further include a closed loop power control adjustment state indication in addition to the TPC command, wherein the closed loop power control adjustment state indication is used to indicate the TPC command to be applied to: closed loop power control adjustment of the additional SRS; or closed loop power control adjustment of the legacy SRS.

For the implementation manner I and the implementation manner II, in one embodiment, a 1 bit indication domain (that is, a closed loop power control adjustment state indication) is newly added to a TPC domain of the DCI received by the terminal device, and is used to indicate the TPC command to be applied to closed loop power control adjustment of the additional SRS, or be applied to closed loop power control adjustment of the legacy SRS. For example: 0-TPC is used for the closed loop power control adjustment of the legacy SRS, and 1-TPC is used for the closed loop power control adjustment of the additional SRS.

In addition, the closed loop power control adjustment state indication is used to indicate the application of the TPC command (that is, it is used for the closed loop power control adjustment of the additional SRS or the legacy SRS). Therefore, other similar terms may also be used to present the closed loop power control adjustment state indication, such as a TPC command type indication, a TPC command state indication and the like.

Figure 2:
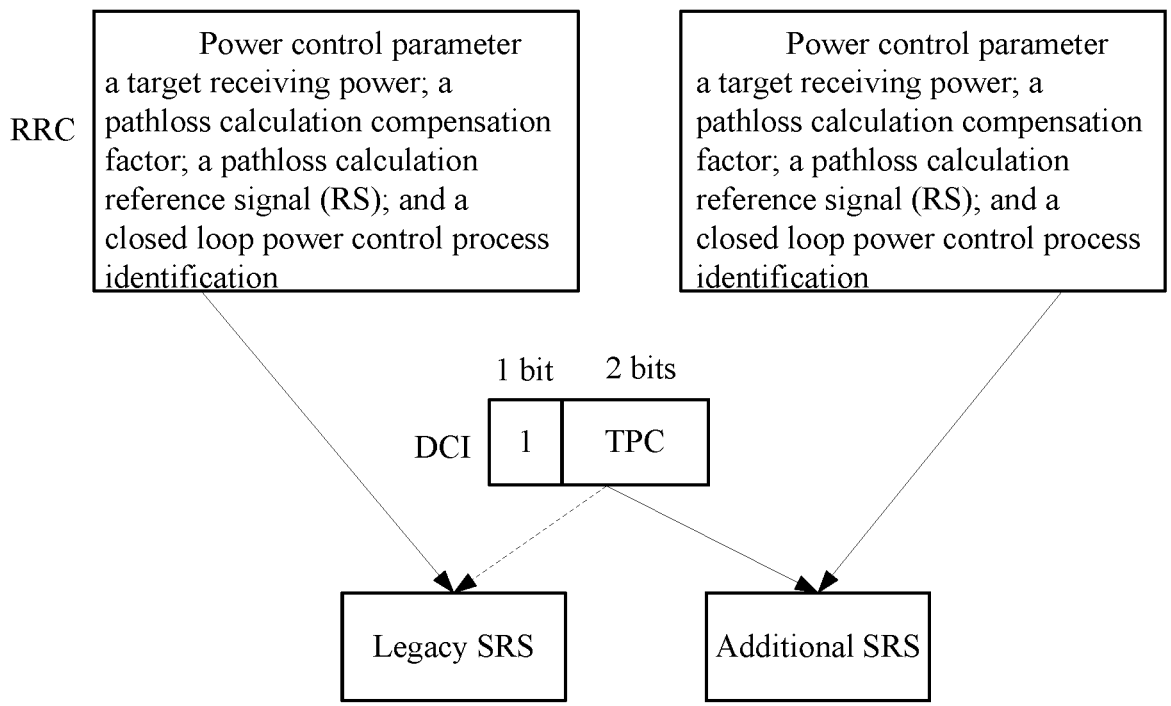
FIG. 2 is a schematic diagram of a power control parameter receiving process according to an embodiment of the present disclosure.

Detail will be described below with reference to one embodiment. As shown in FIG. 2, the network device may configure power control parameters for the additional SRS and the legacy SRS respectively through the RRC signaling. The types of the power control parameter of the additional SRS and the power control parameter of the legacy SRS are shown in FIG. 2, and both include a target receiving power; a pathloss calculation compensation factor; a pathloss calculation reference signal (RS); and a closed loop power control process identification (for example, the closed loop power control process of the legacy SRS is 0, and the closed loop power control process of the additional SRS is 1). Optionally, the closed loop power control process identifications of the additional SRS and the legacy SRS are different.

In this embodiment, the network device may also indicate closed loop power control adjustment quantities for the additional SRS and the legacy SRS respectively through DCI. As shown in FIG. 2, 1 bit is added to the TPC domain of the DCI received by the terminal device, totally 3 bits. The added 1 bit is used to indicate the 2 bit TPC command to be applied to the closed loop power control adjustment of the additional SRS, or be applied to the closed loop power control adjustment of the legacy SRS. In FIG. 2, 1-TPC indicates that the TPC command is applied to the closed loop power control adjustment of the additional SRS.

In this embodiment, the terminal device may realize independent power control on the additional SRS and the legacy SRS based on network device RRC signaling configuration and DCI indication, so that more accurate power control can be realized.

This embodiment may realize accurate power control on the additional SRS by independently configuring the power control parameter for the additional SRS, thereby avoiding the coverage problem or the interference problem of the additional SRS.

For the implementation manner III, in one embodiment, 2 bits are added to the TPC domain of the DCI received by the terminal device, totally 4 bits. High 2 bit is used to indicate the closed loop power control adjustment quantity of the legacy SRS; and low 2 bit is used to indicate the closed loop power control adjustment quantity of the additional SRS.

Detail will be described below with reference to one embodiment, referring to FIG. 3.

Figures 3, 4:
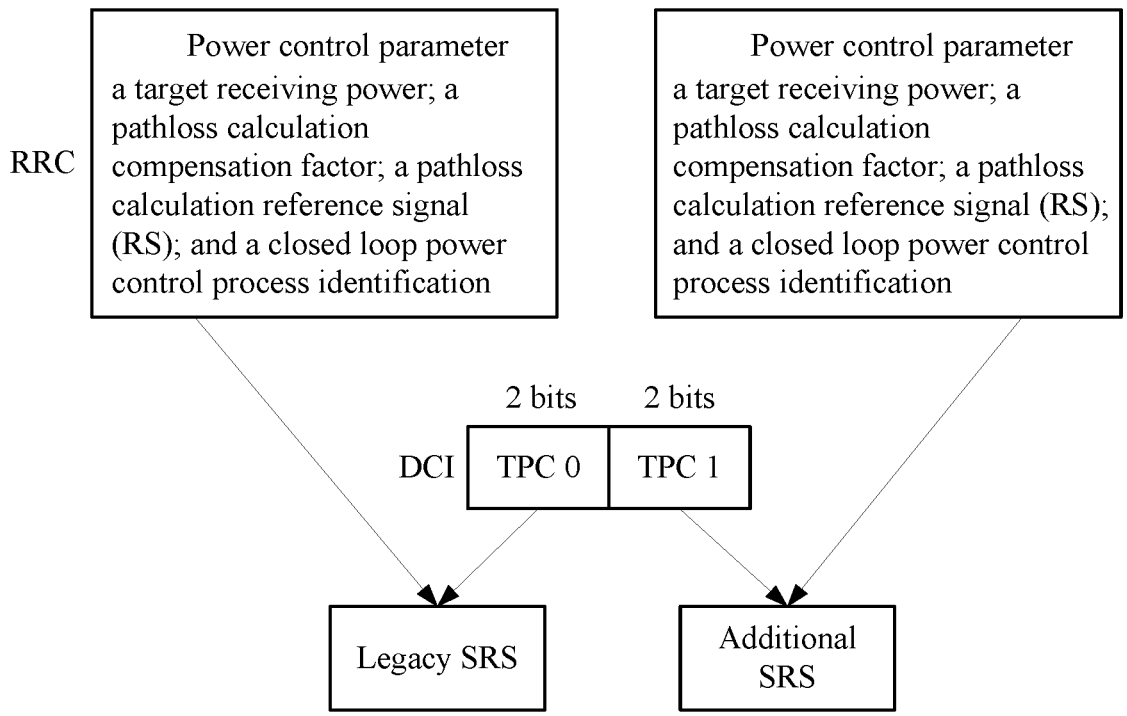
FIG. 3 is a schematic diagram of a power control parameter receiving process according to another embodiment of the present disclosure.
FIG. 4 is a flowchart of an SRS power control method according to another embodiment of the present disclosure.

As shown in FIG. 3, the network device may configure power control parameters for the additional SRS and the legacy SRS respectively through the RRC signaling.

The types of the power control parameter of the additional SRS and the power control parameter of the legacy SRS are shown in FIG. 3, and both include a target receiving power; a pathloss calculation compensation factor; a pathloss calculation reference signal (RS); and a closed loop power control process identification (for example, the closed loop power control process of the legacy SRS is 0, and the closed loop power control process of the additional SRS is 1). Optionally, the closed loop power control process identifications of the additional SRS and the legacy SRS are different.

In this embodiment, the network device may also indicate closed loop power control adjustment quantities for the additional SRS and the legacy SRS respectively through DCI. As shown in FIG. 3, 2 bits are added to the TPC domain of the DCI received by the terminal device, totally 4 bits. High 2 bits are used to indicate the closed loop power control adjustment quantity of the legacy SRS; and low 2 bits are used to indicate the closed loop power control adjustment quantity of the additional SRS.

In this embodiment, the terminal device may realize independent power control on the additional SRS and the legacy SRS based on network device RRC signaling configuration and DCI indication, so that more accurate power control can be realized.

This embodiment may realize accurate power control on the additional SRS by independently configuring the power control parameter for the additional SRS, thereby avoiding the coverage problem or the interference problem of the additional SRS.

In the above embodiments, if the additional SRS and the legacy SRS are transmitted in one TTI and the terminal device needs to calculate or report a power margin within the TTI, the terminal device calculates the power margin based on one of:
  (1) the maximum of the transmitting power of the additional SRS and the transmitting power of the legacy SRS;
  (2) the transmitting power of the additional SRS; or
  (3) the transmitting power of the legacy SRS.

For example, the transmitting power of the additional SRS is greater than the transmitting power of the legacy SRS, and the power margin may be calculated based on the difference between the maximum transmitting power of the terminal device and the transmitting power of the additional SRS. For another example, the power margin is calculated directly based on the maximum transmitting power of the terminal device and the transmitting power of the additional SRS; or the power margin is calculated directly based on the maximum transmitting power of the terminal device and the transmitting power of the legacy SRS.

The SRS power control method according to the embodiments of the present disclosure is described below in detail with reference to FIG. 1 to FIG. 3. The SRS power control method according to another embodiment of the present disclosure is described with reference to FIG. 4. It may be understood that the interaction between the network device and the terminal device described on the network device side is the same as that described on the terminal device side in the method shown in FIG. 1. To avoid repetition, relevant descriptions are appropriately omitted.

FIG. 4 is a schematic flowchart for implementing the SRS power control method according to the embodiment of the present disclosure. As shown in FIG. 4, the method 400 includes:

S402: transmitting a power control parameter, wherein the power control parameter is used for a terminal device to determine a transmitting power of an additional SRS.

Optionally, as one embodiment, the above power control parameter includes a first control parameter and a second power control parameter. The step of transmitting the power control parameter mentioned in S402 includes:
  transmitting an RRC signaling, and
  transmitting DCI, wherein the first power control parameter is configured by the RRC signaling, and the second power control parameter is indicated by the DCI.

Optionally, as one embodiment, the additional SRS and the legacy SRS are transmitted in one TTI; and the power control parameter of the additional SRS and the power control parameter of the legacy SRS are independently configured and/or independently indicated.

The SRS power control method according to the embodiments of the present disclosure is described below in detail with reference to FIG. 1 to FIG. 4. A terminal device according to an embodiment of the present disclosure will be described in detail below with reference to FIG. 5.

Figure 5:
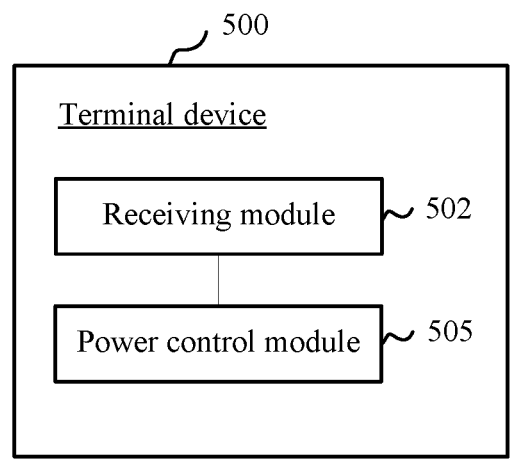
FIG. 5 is a structural schematic diagram of a terminal device according to an embodiment of the present disclosure.

FIG. 5 is a schematic structural diagram of a terminal device according to an embodiment of the present disclosure. As shown in FIG. 5, a terminal device 500 includes:
- a receiving module 502, configured to receive a power control parameter, wherein the power control parameter is used to determine a transmitting power of an additional SRS; and
- a power control module 504, configured to determine the transmitting power of the additional SRS according to the power control parameter.

In the embodiments of the present disclosure, the terminal device receives the power control parameter for determining the transmitting power of the additional SRS and determines the transmitting power of the additional SRS according to the power control parameter so as to realize power control on the additional SRS. The embodiments of the present disclosure may avoid the problem of low signal quality of the additional SRS caused by inaccurate additional SRS power control or the problem of interference to other users in a communication system by the additional SRS as far as possible, thereby improving communication effectiveness and reliability.

Optionally, as one embodiment, the power control parameter includes a first power control parameter and a second power control parameter, wherein the first power control parameter is configured by a radio resource control (RRC) signaling; and the second power control parameter is indicated by downlink control information (DCI).

Optionally, as one embodiment, the additional SRS and the legacy SRS are transmitted in one transmission time interval (TTI); and the power control parameter and the power control parameter of the legacy SRS are independently configured and/or independently indicated.

Optionally, as one embodiment, the second power control parameter includes a transmitting power control (TPC) command. The TPC command is used to indicate: a closed loop power control adjustment quantity of the additional SRS; and/or a closed loop power control adjustment quantity of the legacy SRS.

Optionally, as one embodiment, the second power control parameter includes a closed loop power control adjustment state indication and a TPC command, wherein the closed loop power control adjustment state indication is used to indicate the TPC command to be applied to: closed loop power control adjustment of the additional SRS; or closed loop power control adjustment of the legacy SRS.

Optionally, as one embodiment, the terminal device 500 further includes a power margin determining module, configured to, if the additional SRS and the legacy SRS are transmitted in one TTI and the terminal device 500 needs to calculate or report a power margin within the TTI, calculate the power margin based on one of: the maximum of the transmitting power of the additional SRS and the transmitting power of the legacy SRS; the transmitting power of the additional SRS; or the transmitting power of the legacy SRS.

Optionally, as one embodiment, the first power control parameter includes at least one of: a target receiving power of the additional SRS; a pathloss calculation compensation factor of the additional SRS; a pathloss calculation reference signal of the additional SRS; or a closed loop power control process identification of the additional SRS.

The terminal device 500 according to the embodiment of the present disclosure may be referenced to the flow corresponding to the method 100 according to the embodiment of the present disclosure; furthermore, each unit/module in and the foregoing other operations and/or functions of the terminal device 500 are used to implement the corresponding flow of the method 100, can achieve the same or equivalent technical effect, and will no longer be described here for the purpose of brevity.

Figure 6:
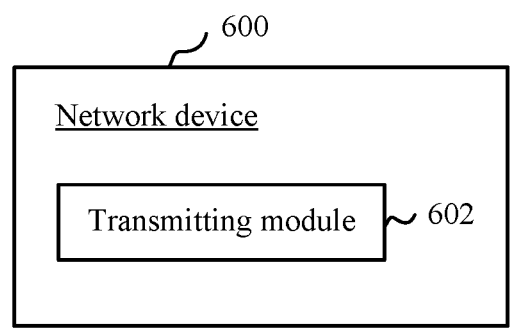
FIG. 6 is a schematic structural diagram of a network device according to an embodiment of the present disclosure.

FIG. 6 is a schematic structural diagram of a network device according to an embodiment of the present disclosure. As shown in FIG. 6, the network device 600 includes:
- a transmitting module 602, configured to transmit a power control parameter, wherein the power control parameter is used for a terminal device to determine a transmitting power of an additional SRS.

In the embodiments of the present disclosure, the terminal device receives the power control parameter for determining the transmitting power of the additional SRS and determines the transmitting power of the additional SRS according to the power control parameter so as to realize power control on the additional SRS. The embodiments of the present disclosure may avoid the problem of low signal quality of the additional SRS caused by inaccurate additional SRS power control or the problem of interference to other users in a communication system by the additional SRS as far as possible, thereby improving communication effectiveness and reliability.

Optionally, as one embodiment, the transmitting module 602 is configured to transmit an RRC signaling and transmitting DCI, wherein the first power control parameter is configured by the RRC signaling, and the second power control parameter is indicated by the DCI.

Optionally, as one embodiment, the additional SRS and the legacy SRS are transmitted in one TTI; and the power control parameter and the power control parameter of the legacy SRS are independently configured and/or independently indicated.

The network device 600 according to the embodiment of the present disclosure may be referenced to the flow corresponding to the method 400 according to the embodiment of the present disclosure; furthermore, each unit/module in and the foregoing other operations and/or functions of the network device 600 are used to implement the corresponding flow of the method 400, can achieve the same or equivalent technical effect, and will no longer be described here for the purpose of brevity.

Figure 7:
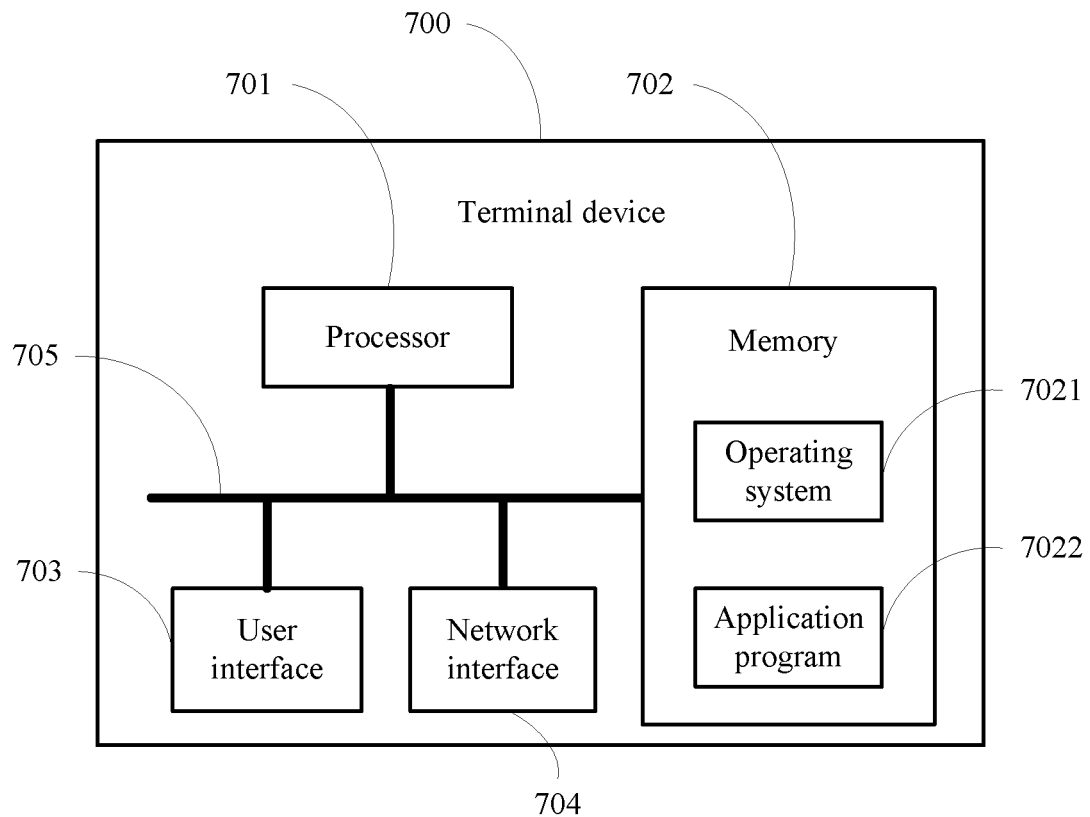
FIG. 7 is a schematic structural diagram of a terminal device according to another embodiment of the present disclosure.

FIG. 7 is a block diagram of a terminal device according to another embodiment of the present disclosure. As shown in FIG. 7, the terminal device 700 includes: at least one processor 701, a memory 702, at least one network interface 704, and a user interface 703. The components in the user equipment 700 are coupled together through a bus system 705. It may be understood that the bus system 705 is used to implement connection and communication between these components. In addition to a data bus, the bus system 705 also includes a power bus, a control bus, and a status signal bus. However, for clarity of description, various buses are marked as the bus system 705 in FIG. 7.

The user interface 703 may include a display, a keyboard, a clicking device (for example: a mouse and a trackball), a touch panel or a touchscreen, etc.

It may be understood that the memory 702 in this embodiment of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchlink dynamic random access memory (SLDRAM), and a direct rambus random access memory (DRRAM). The memory 702 in the system and the method that are described in the embodiments of the present disclosure is to include but is not limited to these memories and a memory of any other proper type.

In some implementations, the memory 702 stores the following elements: executable modules or data structures, a subset thereof, or an extended set thereof: an operating system 7021 and an application program 7022.

The operating system 7021 includes various system programs, for example, a framework layer, a kernel library layer, and a driver layer. The operating system 7021 is configured to implement various basic services and process hardware-based tasks. The application program 7022 includes various application programs, for example, a media player and a browser, and is configured to implement various application services. A program implementing the method in the embodiments of the present disclosure may be included in the application 7022.

In this embodiment of the present disclosure, the terminal device 700 further includes a computer program stored in the memory 702 and executable on the processor 701, and when the computer program is executed by the processor 701, the steps of the method 100 are implemented.

The methods disclosed in the foregoing embodiments of the present disclosure may be applied to the processor 701, or may be implemented by the processor 701. The processor 701 may be an integrated circuit chip having a signal processing capability. During implementation, the steps of the foregoing method may be completed by hardware integrated logic circuits in the processor 701 or instructions in a form of software. The processor 701 may be a general-purpose processor, a digital signal processor (DSP), an application specific integrated circuit (ASIC), a field programmable gate array (FPGA) or other programmable logic devices, a discrete gate or a transistor logic device, and a discrete hardware assembly. The processor may implement or perform the methods, the steps, and logical block diagrams that are disclosed in the embodiments of the present disclosure. The general-purpose processor may be a microprocessor or may be any conventional processor or the like. The steps of the method disclosed in the embodiments of the present disclosure may be directly executed by a hardware decoding processor or by a combination of hardware and software modules in the decoding processor. The software module may be located in a mature non-transitory computer-readable storage medium in this field such as a random access memory, a flash memory, a read-only memory, a programmable read-only memory or an electrically erasable programmable memory, or a register. The non-transitory computer-readable storage medium is located in the memory 702, and the processor 701 reads information from the memory 702 and completes the steps of the foregoing method in combination with hardware of the processor 701. The non-transitory computer readable storage medium stores a computer program, and when the computer program is executed by the processor 701, the steps of the foregoing embodiment of method 100 are implemented.

It can be understood that those embodiments described in the embodiments of the present disclosure can be implemented with hardware, software, firmware, middleware, microcode, or a combination thereof. For implementation with hardware, the processing unit can be implemented in one or more application specific integrated circuits (ASIC), a digital signal processor (DSP), a digital signal processing device (DSPD), a programmable logic device (PLD), a field-programmable gate array (FPGA), general processors, controllers, micro-controllers, microprocessors, and another electronic unit for implementing the functions of the present application, or their combinations.

For implementation with software, technologies described in the embodiments of the present disclosure may be implemented by executing functional modules (for example, a process and a function) in the embodiments of the present disclosure. Software code may be stored in a memory and executed by a processor. The memory may be implemented in the processor or outside the processor.

The terminal device 700 can implement each process implemented by the terminal device in the foregoing embodiments, and can achieve the same or equivalent technical effect. To avoid repetition, details are not described herein again.

Figure 8:
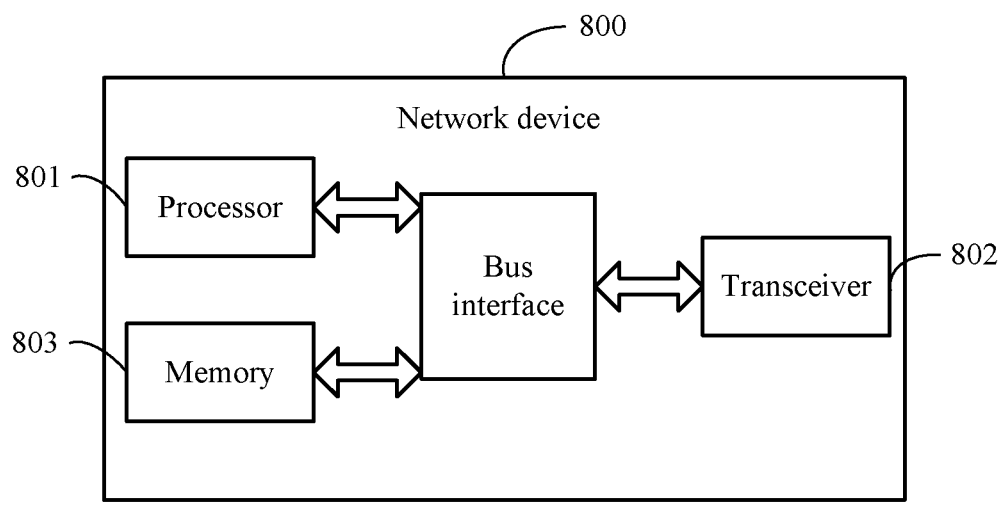
FIG. 8 is a schematic structural diagram of a network device according to another embodiment of the present disclosure.

Referring to FIG. 8, FIG. 8 is a structural diagram of a network device to which an embodiment of the present disclosure is applied. The network device can implement details of the embodiment of the method 400, and achieve a same effect. As shown in FIG. 8, a network device 800 includes a processor 801, a transceiver 802, a memory 803, and a bus interface.

In this embodiment of the present disclosure, the network device 800 further includes: a computer program stored in the memory 803 and executable on the processor 801. When the computer program is executed by the processor 801, the steps of the method 400 are implemented.

In FIG. 8, a bus architecture may include any quantity of interconnected buses and bridges, which are connected together by one or more processors represented by the processor 801 and various circuits of a memory represented by the memory 803. The bus architecture may further link various other circuits such as a peripheral device, a voltage regulator, and a power management circuit together. These are all well-known in the art, and therefore are not described in this specification. The bus interface provides interfaces. The transceiver 802 may include a plurality of elements, that is, include a transmitter and a receiver, and provide units for communication with various other devices on a transmission medium.

The processor 801 is responsible for managing the bus architecture and common processing, and the memory 803 may store data used when the processor 801 performs an operation.

The embodiments of the present disclosure further provide a non-transitory computer-readable storage medium. The non-transitory computer-readable storage medium stores a computer program, and when a processor executes the computer program, the processes of the embodiments of the foregoing methods 100 and 400 are implemented and the same technical effect can be achieved. To avoid repetition, details are not described herein again. The non-transitory computer readable storage medium includes a read-only memory (ROM), a random access memory (RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. Without more restrictions, an element defined by a phrase "including a . . . " does not exclude presence of other identical elements in the process, method, article, or apparatus that includes the very element.

According to the foregoing descriptions of the implementations, a person skilled in the art may clearly understand that the method in the foregoing embodiments may be implemented by using software and a required universal hardware platform, or certainly, may be implemented by using hardware. However, in many cases, the former is a preferred implementation. Based on such an understanding, the technical solutions of the present disclosure present the original or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A sounding reference signal (SRS) power control method, performed by a terminal device and comprising:
   receiving a power control parameter, wherein the power control parameter is used to determine a transmitting power of an additional SRS; and
   determining the transmitting power of the additional SRS according to a received power control parameter; wherein
   the received power control parameter and a power control parameter of a legacy SRS are independently configured.

2. The method according to claim 1, wherein the received power control parameter comprises a first power control parameter and a second power control parameter;
   the first power control parameter is configured by a radio resource control (RRC) signaling, and the second power control parameter is indicated by downlink control information (DCI).

3. The method according to claim 2, wherein the second power control parameter comprises a transmission power control (TPC) command, and the TPC command is used to indicate:
   a closed loop power control adjustment quantity of the additional SRS; and/or
   a closed loop power control adjustment quantity of the legacy SRS.

4. The method according to claim 2, wherein the second power control parameter comprises a closed loop power control adjustment state indication and a transmission power control (TPC) command,
   the closed loop power control adjustment state indication being configured to indicate the TPC command to be applied to:
   closed loop power control adjustment of the additional SRS, or
   closed loop power control adjustment of the legacy SRS.

5. The method according to claim 2, wherein the received additional SRS and the legacy SRS are transmitted in one TTI; and
   the received power control parameter and the power control parameter of the legacy SRS are independently indicated.

6. The method according to claim 1, wherein the additional SRS and the legacy SRS are transmitted in one transmission time interval (TTI); and
   the received power control parameter and the power control parameter of the legacy SRS are independently indicated.

7. The method according to claim 1, wherein if the additional SRS and the legacy SRS are transmitted in one TTI and the terminal device needs to calculate or report a power margin within the TTI, the method further comprises:
   calculating the power margin based on one of:
   a maximum of the transmitting power of the additional SRS and the transmitting power of the legacy SRS;
   the transmitting power of the additional SRS; or
   the transmitting power of the legacy SRS.

8. The method according to claim 1, wherein the received power control parameter comprises a first power control parameter, the first power control parameter configured through an RRC signaling comprises at least one of:
   a target receiving power of the additional SRS;
   a pathloss calculation compensation factor of the additional SRS;
   a pathloss calculation reference signal of the additional SRS; or
   a closed loop power control process identification of the additional SRS.

9. A sounding reference signal (SRS) power control method, performed by a network device and comprising:
   transmitting a power control parameter, wherein a transmitted power control parameter is used for a terminal device to determine a transmitting power of an additional SRS; wherein
   the transmitted power control parameter and a power control parameter of a legacy SRS are independently configured.

10. The method according to claim 9, wherein the transmitted power control parameter comprises a first control parameter and a second power control parameter; and the transmitting the power control parameter comprises:
    transmitting a radio resource control (RRC) signaling; and
    transmitting downlink control information (DCI); wherein the first power control parameter is configured by the RRC signaling, and the second power control parameter is indicated by the DCI.

11. The method according to claim 10, wherein the additional SRS and the legacy SRS are transmitted in one TTI; and
the transmitted power control parameter and the power control parameter of the legacy SRS are independently indicated.

12. The method according to claim 9, wherein the additional SRS and the legacy SRS are transmitted in one transmission time interval (TTI); and
the transmitted power control parameter and the power control parameter of the legacy SRS are independently indicated.

13. A terminal device, comprising: a memory, a processor, and a computer program stored in the memory and executable on the processor, wherein the computer program, when executed by the processor, causes the terminal device to perform:
receiving a power control parameter, wherein the power control parameter is used to determine a transmitting power of an additional sounding reference signal (SRS); and
determining the transmitting power of the additional SRS according to a received power control parameter; wherein
the received power control parameter and a power control parameter of a legacy SRS are independently configured.

14. The terminal device according to claim 13, wherein the received power control parameter comprises a first power control parameter and a second power control parameter;
the first power control parameter is configured by a radio resource control (RRC) signaling, and the second power control parameter is indicated by downlink control information (DCI).

15. The terminal device according to claim 14, wherein the second power control parameter comprises a transmission power control (TPC) command, and the TPC command is used to indicate:
a closed loop power control adjustment quantity of the additional SRS; and/or
a closed loop power control adjustment quantity of the legacy SRS.

16. The terminal device according to claim 14, wherein the second power control parameter comprises a closed loop power control adjustment state indication and a transmission power control (TPC) command,
the closed loop power control adjustment state indication being configured to indicate the TPC command to be applied to:
closed loop power control adjustment of the additional SRS, or
closed loop power control adjustment of the legacy SRS.

17. The terminal device according to claim 14, wherein the additional SRS and the legacy SRS are transmitted in one TTI; and
the received power control parameter and the power control parameter of the legacy SRS are independently indicated.

18. The terminal device according to claim 13, wherein the additional SRS and the legacy SRS are transmitted in one transmission time interval (TTI); and
the received power control parameter and the power control parameter of the legacy SRS are independently indicated.

19. The terminal device according to claim 13, wherein if the additional SRS and the legacy SRS are transmitted in one TTI and the terminal device needs to calculate or report a power margin within the TTI, the computer program, when executed by the processor, causes the terminal device to further perform: calculating the power margin based on one of:
a maximum of the transmitting power of the additional SRS and the transmitting power of the legacy SRS;
the transmitting power of the additional SRS; or
the transmitting power of the legacy SRS.

20. The terminal device according to claim 13, wherein the received power control parameter comprises a first power control parameter, the first power control parameter configured through an RRS signaling comprises at least one of:
a target receiving power of the additional SRS;
a pathloss calculation compensation factor of the additional SRS;
a pathloss calculation reference signal of the additional SRS; or
a closed loop power control process identification of the additional SRS.

* * * * *